Feb. 28, 1939.    L. P. GOULD    2,149,170
LUSTROUS RUBBER ARTICLE
Filed Nov. 11, 1937
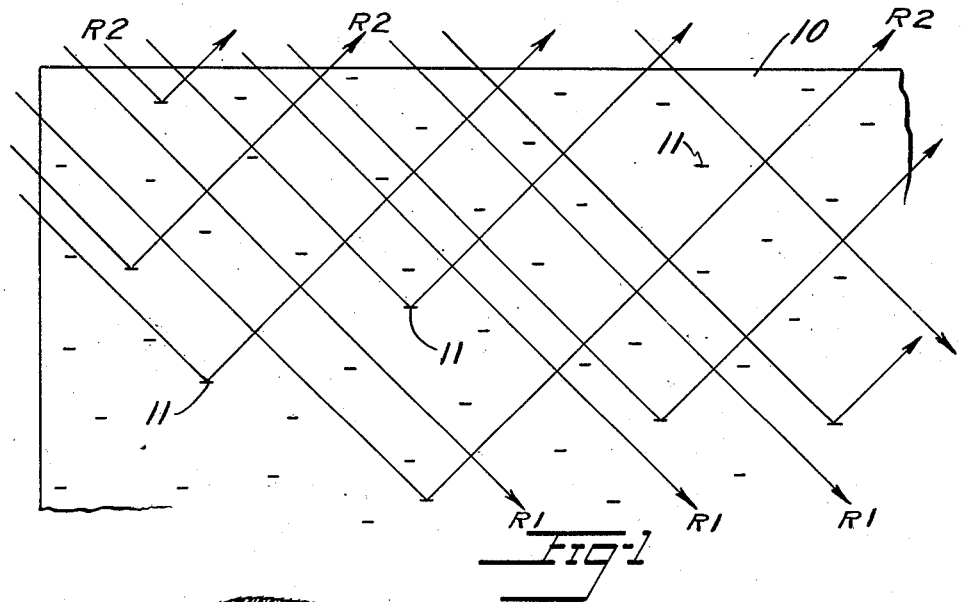
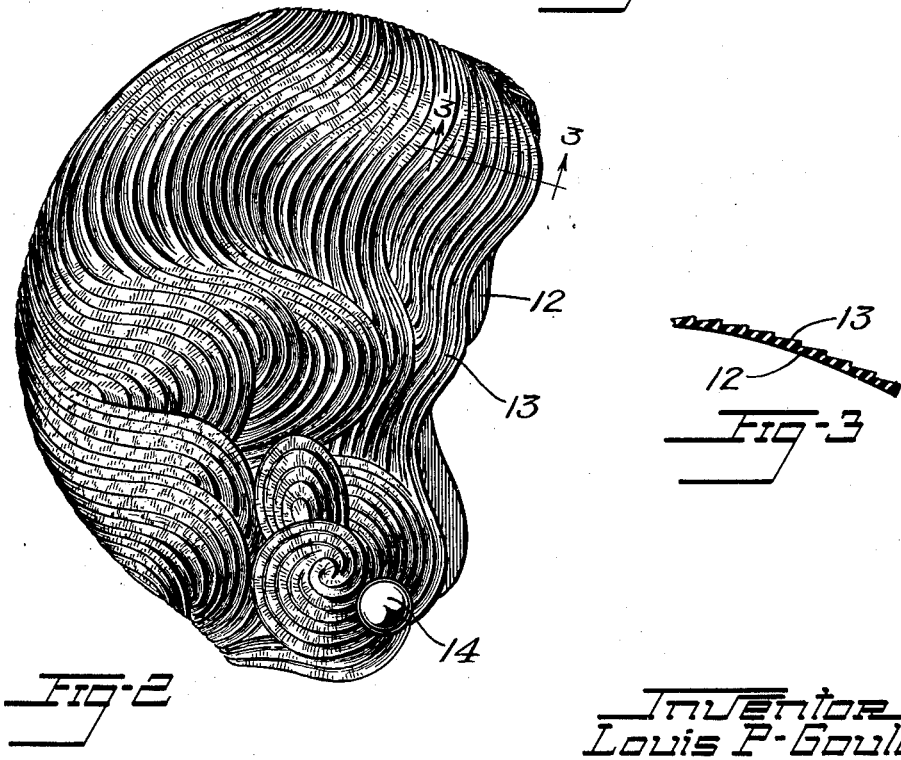
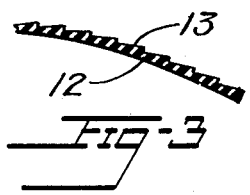
Inventor
Louis P. Gould
By Willis F. Avery
Atty.

Patented Feb. 28, 1939

2,149,170

UNITED STATES PATENT OFFICE 2,149,170

LUSTROUS RUBBER ARTICLE

Louis P. Gould, Akron, Ohio, assignor to The B. F. Goodrich Company, New York, N. Y., a corporation of New York Application November 11, 1937, Serial No. 174,027

8 Claims. (Cl. 2—68)

This invention relates to the manufacture of rubber articles and has for its chief object the economical and efficient provision of softly lustrous rubber articles exhibiting what is technically known as "vitreous luster" as distinguished from the characteristically different "metallic luster," and is especially useful in the manufacture of articles which desirably should simulate softly lustrous materials, a typical example being a bathing cap designed to simulate a woman's hair.

Luster is a psychological phenomenon and is not necessarily a characteristic property of any particular material. Thus, by suitable regulation and control of lighting and conditions of observation, non-metallic materials may be caused to exhibit typical metallic luster and vice-versa. It has been found (Journal of Physical Chemistry 28, 588; 29, 564) that metallic luster is exhibited by any material viewed by reflected light when sufficient light is reflected essentially from a single plane and there are suitable variations of light intensity either in space or in time. On the other hand, vitreous luster is exhibited by any material viewed by reflected light when the light is reflected from many planes and there are suitable variations of light intensity either in space or in time.

Numerous methods of providing luster in rubber articles have been suggested and some of the suggested methods have been widely used commercially, but all prior methods of providing luster in ordinary rubber goods, of which applicant is aware, have attempted to alter the light-reflecting properties of the surface of the rubber and accordingly have produced only metallic lusters, and the more desirable soft vitreous lusters have not been satisfactorily achieved.

In the present invention, I avoid reflecting incident light from essentially a single plane, and produce ordinary rubber goods exhibiting typical vitreous luster by permitting the incident light rays to penetrate the rubber to varying depths before being reflected, and preferably by even permitting a portion of the light to pass entirely through the rubber. This effect is achieved by utilizing a translucent rubber base and incorporating in the translucent base an extremely small quantity of minute light-reflecting particles which are relatively widely scattered and spaced-apart throughout the translucent rubber in such manner as to permit incident light rays to penetrate the rubber to varying depths before being reflected, and even to permit some of the rays to pass entirely through the rubber. The vitreous luster so produced may be enhanced, as in a preferred embodiment of the invention, by molding physical irregularities in the article surface and thereby increasing the variations in reflected light intensity and favorably altering a second factor necessary to the production of vitreous luster. In addition to enhancing the vitreous luster, such surface irregularities serve to diffuse the reflected light and thereby further contribute to the production of a softly lustrous appearance more closely simulating a naturally lustrous material, for example, human hair.

Lustrous effects of the character achieved in the present invention, of course, cannot be depicted in conventional drawings, but some illustration has been desirable, and the accompanying drawing is submitted, not as completely faithful portrayals of the products, but merely as aids in arriving at an understanding of the invention. Of the drawing, Fig. 1 is a diagrammatic view representing a fragmentary vertical section of a rubber article embodying the present invention, and illustrating qualitatively but not quantitatively the optical mechanism of the invention as applicant now understands it;

Fig. 2 is a side elevation showing a bathing cap embodying the present invention in a preferred form; and Fig. 3 is a vertical section taken on line 3—3 of Fig. 2.

A rubber article embodying the present invention may comprise a smooth-faced, thin sheet of translucent, vulcanized rubber 10 having a multitude of microscopic light-reflecting particles indicated by the dashes 11, 11 distributed substantially uniformly throughout the translucent rubber in such extremely small quantities that the individual particles or particle groups will be more or less widely spaced apart as indicated qualitatively in Fig. 1. When light strikes such an article some of the incident light rays indicated by the arrows $R_1$, $R_1$ will find their way between the spaced reflecting particles and pass entirely through the translucent rubber. Other rays, indicated by the arrows $R_2$, $R_2$, will penetrate the rubber for varying distances and then will strike some of the light-reflecting particles 11, 11 to be reflected out through the entering surface. As a result, a person viewing the article in reflected light receives light stimuli reflected from countless planes throughout the depth of the rubber which produces the mental image associated with vitreous luster, and the article presents a soft lustrous appearance far more pleasing than the metallic lusters heretofore produced.

To manufacture such an article, a suitable translucent base composition is first prepared in the usual manner by mixing crude rubber and suitable compounding ingredients. For example, a typical base composition may contain 94 lbs. 10 oz. of pale crepe crude rubber, 12 oz. of zinc oxide, 6 oz. of an organic accelerator such as the commercial product sold under the trade name "Zimate", 1 lb. 12 oz. sulfur, 2 lbs. of a softener such as rosin oil, and 8 oz. of a commercial age-resister, for each 100 lbs. of composition. To the mixed base composition may then be added, for example, 0.05% by weight of 325 mesh aluminum powder which is thoroughly mixed with the base composition to produce a homogenous mixture. The mixture is then sheeted on a calender and molded to produce a vulcanized rubber sheet for example about $\frac{3}{32}$ to $\frac{1}{16}$ inch thick.

A vulcanized rubber sheet prepared as described exhibits a beautiful gray vitreous luster with none of the metallic luster which the use of aluminum powder ordinarily would be expected to produce. The translucency of the sheet is not entirely destroyed, however, and a considerable proportion of incident light passes entirely through the sheet, although no distinct outlines of objects can be seen through the sheet.

Any so-called transparent, semi-transparent or translucent rubber compositions containing only minor proportions, if any, of opaque pigments may be substituted for the exemplary composition set forth in the foregoing specific example, and all such light-transmitting compositions are included by the term "translucent rubber composition" as used herein.

Other highly-reflective, finely-divided metallic powders such as any of the several bronze powders available commercially may be substituted for the preferred aluminum powder in quantities varying from about 0.005% to 0.150% by weight in ordinary thin-walled rubber articles up to about $\frac{1}{16}$ inch thick. In thicker articles, the maximum proportion of metallic powder should be reduced to retain some translucency. As a practical matter, the quantity of metallic powder should be such as to permit light to be faintly seen through the rubber when it is held between the eye and a source of strong light such as an ordinary electric lamp, as this condition has been found to produce the most desirable vitreous luster. It is also possible to substitute for the metallic powders other non-metallic powders and finely-divided materials of varying reflectivities such as finely-divided mica, pearl essence and the like, but since these materials are more or less translucent, the proportion added may be increased, and the appearance of an article containing such materials will be somewhat different from the appearance of articles containing metallic powders, although both types of articles exhibit vitreous luster. The light-reflecting particles should be of such size, herein termed "microscopic size", as not to be individually visible in the rubber composition under ordinary conditions of casual observation without magnification.

Lustrous colored articles may be produced by adding to the composition of the foregoing specific example a suitable quantity of a rubber-soluble dye, which will impart color tone to the article without altering the luster-producing effect of the metallic powder. It has been found, however, that richer colored lusters are achieved when the coloring is effected by adding to the rubber composition, along with the small proportion of metallic powder, a similarly small quantity of a pigment which is practically insoluble in rubber. For example, a rich lustrous red product may be made by adding to each 100 pounds of the specific example as little as 2 oz. of a red pigment such as the commercial pigment sold by Sherwin-Williams Company under the designation "#339 Barium Lake Red Toner". Likewise a lustrous green rubber product may be produced by adding to each 100 pounds of the composition of the specific example 1 oz. of yellow cadmium lithopone and 1 oz. of the pigment sold by the Imperial Color Works under the designation "Rubber Blue No. A4352".

For simplicity, the invention has been described thus far as applied to a simple smooth-faced rubber sheet in which the characteristic vitreous luster may be observed uncomplicated by other factors. In the commercial application of the discovery, it has been found that the soft lustrous effects may be enhanced by molding definite irregularities such as ribs or protuberances in the article surface and thereby increasing the variations in intensity of reflected light and also diffusing the light reflected from the article. Such a combination of enhanced vitreous luster and surface diffusion of light is especially useful in an article such as the rubber bathing cap illustrated in Fig. 2, which comprises a head-fitting rubber body 12 molded in the customary manner from a lustrous rubber composition prepared according to the directions heretofore given, and provided with molded surface "saw-tooth" ribs 13, designed to simulate a woman's hair arranged in an attractive coiffure. The vitreous lusters of the rubber composition enhanced and diffused by the molded irregular surface presents an appearance simulating the silky luster of human hair remarkably well and contrasting sharply with the metallic lustre of the metallic snap button 14 customarily provided upon bathing caps for attaching the chin strap. Any desired form of molded surface irregularity or design, of course, may be adopted instead of the hair simulating design illustrated.

While the invention has been described in considerable detail with reference to certain preferred procedures, materials and conditions, numerous modifications and variations may be made therein without departing from the spirit and scope of the invention as defined by the appended claims.

I claim:

1. An article of manufacture comprising a translucent rubber composition having an extremely small proportion of microscopic, light-reflecting particles distributed through the translucent composition in scattered, spaced-apart arrangement permitting some incident light rays to pass entirely through the composition while other incident light rays are being reflected and permitting the rays which are reflected to penetrate the translucent composition to varying depths before being reflected, whereby the article exhibits vitreous luster.

2. An article of manufacture comprising a translucent rubber composition having an extremely small proportion of microscopic, light-reflecting particles distributed through the translucent composition in scattered, spaced-apart arrangment permitting some incident light rays to pass entirely through the composition while other incident light rays are being reflected and permitting the rays which are reflected to penetrate the translucent composition to varying depths before being reflected, whereby the article exhibits vitreous luster, a surface of said composition being formed with physical irregularities effecting variations in reflected light intensity and diffusion of the reflected light and thereby further contributing to the production of a softly lustrous appearance.

3. An article of manufacture comprising a thin, translucent rubber composition having from 0.005 to 0.150 percent of finely-divided, light-reflecting metallic powder particles distributed therethrough in scattered spaced-apart arrangement permitting some incident light rays to pass entirely through the composition while other incident light rays are being reflected and permitting the rays which are reflected to penetrate the translucent composition to varying depths before being reflected, whereby the article exhibits vitreous luster.

4. A bathing cap having an outer surface molded with surface irregularities simulating hair, said cap being formed of a translucent rubber composition having an extremely small proportion of microscopic, light-reflecting particles distributed through the translucent composition in scattered, spaced-apart arrangement permitting some incident light rays to pass entirely through the composition while other incident light rays are being reflected and permitting the rays which are reflected to penetrate the translucent composition to varying depths before being reflected, whereby the article exhibits vitreous luster enhancing the illusion of natural hair.

5. An article of manufacture comprising a translucent rubber composition colored with a rubber-soluble dye and having an extremely small proportion of microscopic, light-reflecting particles distributed through the translucent composition in scattered, spaced-apart arrangement permitting some incident light rays to pass entirely through the composition while other incident light rays are being reflected and permitting the rays which are reflected to penetrate the translucent composition to varying depths before being reflected, whereby the article exhibits vitreous luster.

6. An article of manufacture comprising a translucent rubber composition having a small proportion of finely-divided, light-reflecting particles and a small proportion of colored pigment particles distributed therethrough in scattered spaced-apart arrangement permitting some incident light rays to pass entirely through the composition while other incident light rays are being reflected and permitting the rays which are reflected to penetrate the translucent composition to varying depths before being reflected, whereby the article is colored and exhibits vitreous luster.

7. An article of manufacture comprising a translucent rubber composition having from 0.005 to 0.150 percent of finely-divided, light-reflecting metallic powder particles together with a small percentage of colored pigment particles which are substantially insoluble in rubber distributed therethrough in scattered, spaced-apart arrangement permitting some incident light rays to pass entirely through the composition while other incident light rays are being reflected and permitting the rays which are reflected to penetrate the translucent composition to varying depths before being reflected, thereby the article is colored and exhibits vitreous luster.

8. In a molded rubber article having an exposed surface designed to simulate human hair, the combination with a body having walls not more than $\frac{1}{16}$ inch thick formed of a translucent composition having natural rubber as a base and containing from 0.005 to 0.150 per cent of metallic powder particles of microscopic size distributed substantially uniformly throughout the composition in scattered spaced-apart arrangement permitting some incident light rays to pass entirely through the walls while other incident light rays are being reflected and permitting the rays which are reflected to penetrate the translucent composition to varying depths before being reflected, of a multitude of molded ridges curving over said exposed surface of the article in closely-spaced, parallel, wavy lines suggestive of an attractive coiffure, whereby the vitreous luster produced by the scattered metallic particles in the translucent body is enhanced by the added variations in intensity of reflected light effected by the ridges to produce a combined effect of heightened vitreous luster simulating the soft luster of human hair and lending reality to the otherwise less real illusion of human hair suggested by the wavy ridges.

LOUIS P. GOULD.